United States Patent Office.

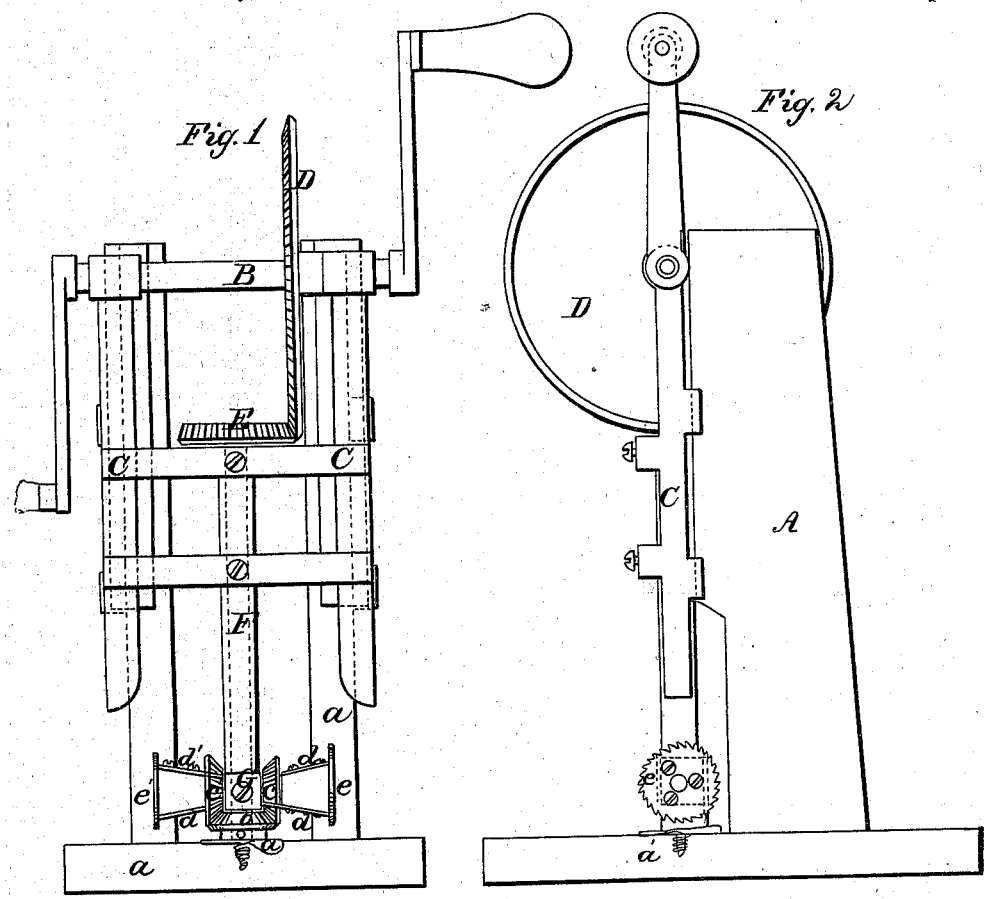

ARTHUR O. NEAL, OF HYDE PARK, MASSACHUSETTS.

Letters Patent No. 95,129, dated September 21, 1869.

---

IMPROVEMENT IN MORTISING-MACHINE.

---

The Schedule referred to in these Letters Patent and making part of the same.

---

To all whom it may concern:

Be it known that I, ARTHUR O. NEAL, of Hyde Park, in the county of Norfolk, and State of Massachusetts, have invented a new and improved "Mortising-Machine," of which the following is a full, clear, and exact description thereof, reference being had to the accompanying drawings, in which—

Figure 1 is a front view of the mortising-machine.
Figure 2, a side elevation.
Figure 3, a horizontal section, showing the cutters, borer, and gears on enlarged scale.
Figure 4 is a detailed view of cutters and saw.

The same letters refer to the same parts in the different figures.

The object of my invention is to produce a portable hand-mortising machine for making square or oblong holes, to be effective and easily built and operated; and My invention consists in cutting a square or oblong hole by means of a vertical double-lip screw-auger, two sets of cutters, and circular saws, connected and operated by gears, and attached to a sliding frame of a common hand-drilling machine, to be raised and lowered simultaneously.

Referring to the drawings—

A is a frame of a hand-drilling machine, with crank-shaft B, gears D E, and stationary tube F, all attached to the sliding frame C, which is fed in the ordinary manner.

To the lower portion of tube F is firmly secured a cross-head, consisting of two horizontal arms, on which revolve the gears $c$ $c'$, cutters $d$ $d'$, and circular saws $e$ $e'$, respectively.

Through tube F passes the drill-stock $g$, with bevel-gear E on its upper, and bevel-gear $b$, with double-lip screw-auger $a$, at its lower end.

The bevel-gear $b$ meshes into the bevel-gears $c$ $c'$, and thus communicates motion to the cutters.

Each of the cutters $d$ $d'$ consist of two blades screwed upon opposite sides of a pyramidal square block, to the ends of which the bevel-gear $c$ $c'$ and circular saw $e$ $e'$ are firmly secured.

The diameters of the screw-auger $a$ and the circular saws $e$ $e'$ correspond to the width of the hole to be cut.

The cutters $d$ $d'$ are set in such a manner that the cutting-edge revolves in a line with the teeth of the saw, and projects toward the auger until it reaches the circular hole previously cut by the latter.

In operating the machine, motion will be imparted from crank-shaft B and bevel-gear D to bevel-gear E, spindle $g$, screw-auger $a$, the screw taking hold of the material to be cut, and drawing the tool into it, the double-lip cutting a circular hole of the required width; but bevel-gear $b$ also sets the gears $c$ $c'$ in motion, and with them the rotating cutters $d$ $d'$ and circular saws $e$ $e'$, the saws $e$ $e'$ cutting the ends of the hole square, while the cutters cut out the material between the saws and the auger.

Thus it will be seen that, by this simple device, a square or oblong hole can be cut with great saving of labor, and but little expense, thus providing a very useful tool to carpenters and other workers in wood.

Having thus fully described my invention,

What I claim as new, and desire to secure by Letters Patent, is—

The double-lip screw-auger $a$, in combination with cutters $d$ $d'$ and circular saws $e$ $e'$, when constructed in the manner and for the purpose substantially as described.

In testimony whereof, I have signed my name to this specification, in the presence of two subscribing witnesses.

ARTHUR O. NEAL.

Witnesses:
CARROLL D. WRIGHT,
AUSTIN S. HOWARTH.